US007630358B1

(12) United States Patent (10) Patent No.: US 7,630,358 B1
Lakhani et al. (45) Date of Patent: Dec. 8, 2009

(54) MECHANISM FOR IMPLEMENTING MULTIPLE LOGICAL ROUTERS WITHIN A SINGLE PHYSICAL ROUTER

(75) Inventors: Faizel Lakhani, Campbell, CA (US); Gary Croke, Mountain View, CA (US); Riad Hartani, Palo Alto, CA (US); Bert Tanaka, Saratoga, CA (US); Phillip Laverdiere, Shoreview, MN (US)

(73) Assignee: Sable Networks, Inc., Santa Clara, CA (US)

( * ) Notice: Subject to any disclaimer, the term of this patent is extended or adjusted under 35 U.S.C. 154(b) by 1136 days.

(21) Appl. No.: 10/192,766

(22) Filed: Jul. 9, 2002

Related U.S. Application Data

(60) Provisional application No. 60/304,259, filed on Jul. 9, 2001.

(51) Int. Cl.
 *H04L 12/28* (2006.01)
(52) U.S. Cl. ..................................................... 370/351
(58) Field of Classification Search ................. 370/351, 370/389, 392, 395.3, 395.31, 395.32, 400–402, 370/422
 See application file for complete search history.

(56) References Cited

U.S. PATENT DOCUMENTS

| 5,633,866 | A  | * | 5/1997  | Callon          | 370/397 |
|-----------|----|---|---------|-----------------|---------|
| 5,854,899 | A  | * | 12/1998 | Callon et al.   | 709/238 |
| 6,496,510 | B1 | * | 12/2002 | Tsukakoshi et al. | 370/401 |
| 6,609,153 | B1 | * | 8/2003  | Salkewicz       | 709/223 |
| 6,674,756 | B1 | * | 1/2004  | Rao et al.      | 370/395.21 |
| 6,868,086 | B1 | * | 3/2005  | Putzolu et al.  | 370/401 |

(Continued)

OTHER PUBLICATIONS

NetsEdge Research Group, entitled "Virtual Routing: What's The Goal? And What's Beyond", by Peter Christy, NetsEdge Research Group, dated Aug. 2001, © 2001, (6 pgs).
BrookTrail Research, entitled "Back to Reality, While the rest of the industry pushes VPNs, Allegro Networks brings back Real Private Networks (RPNs)", by Bob Bellman, © 2001, Brook Trail Research, (6 pgs).
Entitled "The Virtual Router: A Tool for Learning How Routers Work", Version 1.0, dated Oct. 13, 2001, (5 pgs).

(Continued)

*Primary Examiner*—Dmitry Levitan
(74) *Attorney, Agent, or Firm*—West & Associates, A PC; Stuart J. West; Charlotte Rodeen-Dickert

(57) ABSTRACT

A mechanism is disclosed for enabling a plurality of logical routers to be implemented within a single physical router. The logical routers emulate the behavior of interconnected, standalone routers. For example, the logical routers may be made aware of the presence of other logical routers within the same physical router. The logical routers may also have internal "links" to each other. In addition, the logical routers may send routing information to each other. Thus, to each other and to routers external to the single physical router, the logical routers appear as if they are interconnected standalone routers. The logical routers may be further endowed with an ability to determine whether the next hop for a set of information (e.g. a packet) is to a logical router within the same physical router or to an external router. The logical routers take advantage of this distinction to perform routing between logical routers more efficiently.

97 Claims, 7 Drawing Sheets

U.S. PATENT DOCUMENTS 6,907,039 B2 * 6/2005 Shen .......................... 370/400
6,973,072 B1 * 12/2005 Muntz ........................ 370/351

OTHER PUBLICATIONS

Final Project Report entitled "Virtual Router—A User Space Router for the Linux Operating System", by Pang Chau and Lei Jin, Stanford University, (35 pgs).

Final Report entitled "Pluggable Virtual Router System", CS344: Network Projects, by Prof. Nick MeKeown, Stanford University, Zhao—Ping Tang, Yuefeng Liu, (36 pgs).

Light Reading—The Global Site for Optical Networking, entitled "Charlotte's Adds VR Features", dated Jul. 10, 2002, http://www.lightreading.com/document.asp?doc_id=16669, (2 pgs).

* cited by examiner

406C

| ADDRESS | NEXT HOP |
|---------|----------|
| X | IDENTIFIER FOR INTERNAL INTERFACE 208(1) |
| ⋮ | ⋮ |

| ADDRESS | NEXT HOP |
|---------|----------|
| X | IDENTIFIER FOR INTERNAL INTERFACE 208(3) |
| ⋮ | ⋮ |

| ADDRESS | NEXT HOP |
|---------|----------|
| X | IDENTIFIER FOR EXTERNAL INTERFACE 206(3) |
| ⋮ | ⋮ |

FIG.5C

MECHANISM FOR IMPLEMENTING MULTIPLE LOGICAL ROUTERS WITHIN A SINGLE PHYSICAL ROUTER

This application claims the benefit of U.S. Provisional Application entitled "Implementing Logical Routers in a Distributed Switching Platform", No. 60/304,259, filed Jul. 9, 2001. The entire contents of this provisional application are hereby incorporated by reference.

FIELD OF THE INVENTION

This invention relates generally to networking, and more particularly to a mechanism for implementing multiple logical routers within a single physical router.

BACKGROUND

Modern networks are typically implemented using a plurality of interconnected, standalone routers. Each router implements a forwarding protocol to forward packets to other routers, and a routing protocol to inform other routers in the network of the links that it has to surrounding routers. By having the routers propagate this routing information to each other, all of the routers in the network are able to ascertain the overall topology of the network. Using this topology information, each router is able to determine, given a destination address, what the next hop should be to route a set of information to a destination.

Recently, there has been a movement towards router aggregation. With router aggregation, the functionality of a plurality of standalone routers is incorporated into a single physical router. With router aggregation, it is possible for multiple routers to share certain resources, such as power supplies, a chassis, cooling mechanisms (e.g. fans), etc. By sharing these resources, cost savings can be realized.

Currently, two approaches are used to implement router aggregation: virtual routers and multi-routers. Under the virtual routers approach, the router aggregation function is achieved mainly through software. Specifically, a single processor executes software to give rise to multiple router processes. Each router process represents a "virtual router", and each router process can be configured to have different functionality. Each router process is able to receive packets, make its own routing decisions, and forward packets to external routers. Thus, in many respects, each router process behaves like a standalone router.

The multi-routers approach is slightly different. Rather than having a single processor give rise to several router processes, the multi-routers approach assigns a processor to each router. Put another way, there are a plurality of processors in a multi-routers system, and each processor executes software to give rise to one router process. Each router process can be configured to have different functionality. In addition, each router process is able to receive packets, make its own routing decisions, and forward packets to external routers. Thus, like the virtual routers, each router process in the multi-routers approach behaves in many respects like a standalone router.

These two approaches have been used primarily by service providers in the networking industry to implement private networks for multiple customers. Specifically, a service provider implements multiple routers (using either of the above approaches) within a single physical router, and then assigns each router to a different customer. The functionality of each router is then tailored to fit the needs of the customer to which that router has been assigned. Once that is done, the customer can use the router to implement the customer's own private network.

As the word "private" suggests, the routers within a single physical router generally do not share information with each other. In fact, they typically are not even aware of each other's presence. That being the case, they do not have links to each other, they do not share routing information with each other, nor do they communicate or interact with each other. For the private network implementation, this lack of awareness and communication is the goal since each private network can have an overlapping address space. However, for many other implementations in which it is desirable for the multiple routers within a single physical router to interact and to truly emulate the behavior of interconnected standalone routers, these limitations cannot be tolerated. For such implementations, the above approaches cannot be used. As a result, a new approach is needed.

SUMMARY

In accordance with one embodiment of the present invention, there is provided a mechanism for enabling a plurality of logical routers to be implemented within a single physical router. In one embodiment, the logical routers emulate the behavior of interconnected, standalone routers. For example, the logical routers may be made aware of the presence of other logical routers within the same physical router. The logical routers may also have internal "links" to each other. In addition, the logical routers may send routing information to each other. In terms of protocol implementation, they act like separate standalone routers. Thus, to each other and to routers external to the single physical router, the logical routers appear as if they are interconnected standalone routers.

In one embodiment, the logical routers may be further endowed with an ability to determine whether the next hop for a set of information (e.g. a packet) is to a logical router within the same physical router or to an external router. This distinction is exploited to perform routing between logical routers more efficiently. By doing so, this embodiment of the present invention provides the best of both worlds. On the one hand, it is able to emulate the behavior of interconnected standalone routers. On the other hand, it is able to take advantage of the fact that the logical routers are not actual standalone routers (but rather are embodied in the same physical router) to carry out information routing more efficiently. By providing the best of both worlds, this embodiment of the present invention represents a significant improvement over the two approaches discussed above.

BRIEF DESCRIPTION OF THE DRAWINGS

FIGS. 5A-5C depict some sample forwarding tables that may be stored and used by the line card of FIG. 4.

DETAILED DESCRIPTION OF EMBODIMENT(S)

Before describing an embodiment of the present invention in detail, some background information will first be provided to facilitate a complete understanding of the invention.

Sample Network

Figure 1:
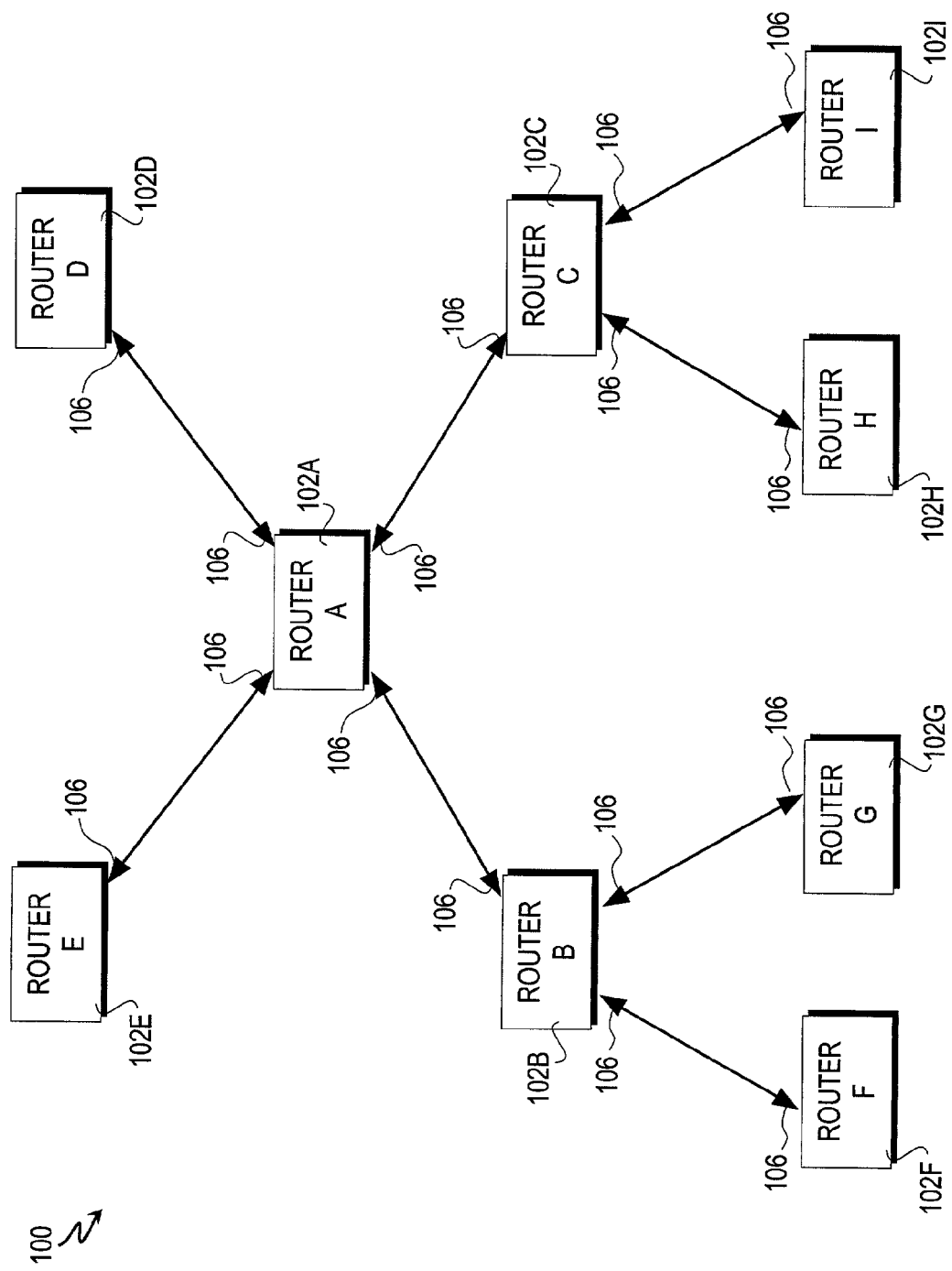
FIG. 1 is a block diagram of a sample network comprising a plurality of interconnected standalone routers.

With reference to FIG. 1, there is shown a block diagram of a sample network 100 comprising a plurality of interconnected routers 102. For the sake of simplicity, only a few routers 102 are shown in FIG. 1; however, if so desired, many more routers 102 may be added to the network 100. In the network 100 of FIG. 1, each router 102 is implemented as a separate standalone router.

To participate as a router within network 100, each router 102 implements at least two types of protocols. A first type of protocol is a forwarding protocol. A number of forwarding protocols are currently known, including but not limited to MPLS (multi-path label switching) and IP (internet protocol), with IP being the most dominant. Since IP is currently the most prevalent, the following discussion will assume that IP is the forwarding protocol. It should be noted though that any other forwarding protocol may be used, if so desired. Basically, the forwarding protocol makes it possible for the various routers 102 to understand each other when forwarding information (e.g. IP packets). For example, the forwarding protocol may dictate the format in which a packet is to be packaged, the addressing scheme that is to be used, and so forth. So long as a common protocol is used, different routers 102 having different construction and made by different manufacturers will be able to forward information to each other in network 100.

A second type of protocol implemented by each router 102 is a routing protocol. Examples of routing protocols include IS-IS, BGP, OSPF, etc. Using a routing protocol, a router 102 can exchange topology information with other routers 102 in the network 100. For example, using a routing protocol, router A 102a can advertise to the rest of the network that it has a link to router E 102e, a link to router D 102d, a link to router B 102b, and a link to router C 102c. Similarly, using a routing protocol, router I 102i can advertise to the rest of the network 100 that it has a link to router C 102c. This exchange of topology information enables all of the routers 102 in the network 100 to ascertain the overall layout or topology of the network. In effect, the routing protocol enables each router 102 to derive a map of the overall network 100. Each router 102 uses this topology information to make individual routing decisions when forwarding sets of information (e.g. packets).

For example, suppose that router H 102h needs to forward a packet having an IP address indicating that the destination router is router G 102g. Using the topology information, router H 102h determines that the next "hop" should be router C 102c; thus, it forwards the packet to router C 102c. When router C 102c receives the packet, it determines, using the topology information, that the next hop should be router A 102a; thus, it forwards the packet to router A 102a. In turn, router A 102a uses the topology information to determine that the next hop should be router B 102b, and forwards the packet to router B 102b. Finally, using the topology information, router B 102b determines that the next hop should be router G 102; thus, it forwards the packet to router G 102g. In this manner, the packet is properly forwarded from router H 102h to router G 102g. As this example shows, each router 102 uses the topology information to make its own determination as to what the next hop should be (i.e. makes it own routing decision).

As noted above, each router 102 in network 100 is implemented as a separate standalone router. That being the case, the routers 102 communicate with each other via external interfaces 106 (shown as darkened triangles) and external links or trunks. An external interface may, for example, be a line card of a router, and an external link may be any transport medium (e.g. fiber optic line, coaxial cable, etc.). In the forwarding example given above, the packet travels from a line card of router H 102h to a line card of router C 102c, then from another line card of router C 102c to a line card of router A 102a, then from another line card of router A 102a to a line card of router B 102b, and then from another line card of router B 102b to a line card of router G 102g. By going from line card to line card, the packet is eventually forwarded from router H 102h to router G 102g.

The above discussion describes the operation of a sample network 100 in which only standalone routers 102 are implemented. This discussion will serve as a basis for comparison with the description of one embodiment of the present invention presented below.

Conceptual Overview

Figure 2:
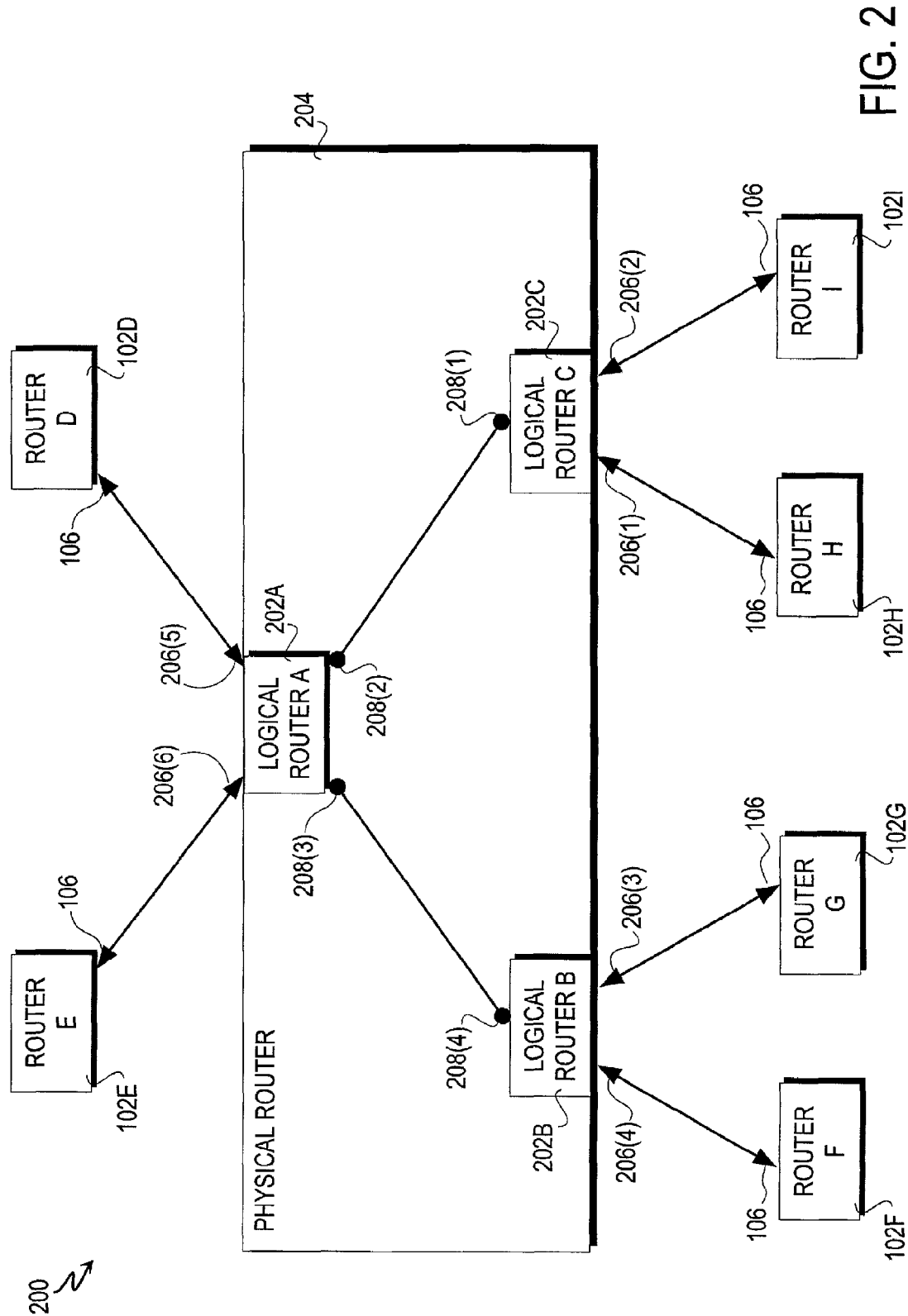
FIG. 2 is a block diagram of the sample network of FIG. 1 with some of the standalone routers implemented as logical routers within a single physical router in accordance with one embodiment of the present invention.

FIG. 2 shows a functional diagram of a sample network 200 in which one embodiment of the present invention may be implemented. Network 200 is basically the same as network 100 except that instead of implementing routers A, B, and C as standalone routers 102a, 102b, 102c, routers A, B, and C are implemented as logical routers 202a, 202b, 202c within a single physical router 204. As will be explained further below, even though the routers A, B, and C are implemented as logical routers 202a, 202b, 202c in network 200, they still maintain the same topology as in network 100. That is, logical router A 202a still has a link to router E 102e, a link to router D 102d, a link to logical router B 202b, and a link to logical router C 202c. Likewise, logical router C 202c still has a link to logical router A 202a, a link to router H 102h, and a link to router I 102i. Similarly, logical router B 202b still has a link to logical router A 202a, a link to router F 102f, and a link to router G 102g. Thus, the topology of the network has not changed.

Also, from an external interface perspective, the network has not changed. That is, logical router A 202a still is linked to routers E 102e and D 102d via external interfaces 206(6), 206(5) (e.g. line cards). Likewise, logical router C 202c is still linked to routers H 102h and I 102i via external interfaces 206(1), 206(2). In addition, logical router B 202b still is linked to routers F 102f and G 102g via external interfaces 206(4), 206(3).

Notice though that the nature of the interfaces and the links between the logical routers 202a, 202b, 202c has changed. In the network 100 of FIG. 1, routers A, B, and C were implemented as standalone routers 102a, 102b, 102c; thus, they were linked via external interfaces 106 and external links or trunks. In contrast, in the network 200 of FIG. 2, routers A, B, and C are implemented as logical routers 202a, 202b, 202c within the same physical router 204; hence, they are not linked by external interfaces and trunks, but rather by internal interfaces 208 (shown as darkened circles) and internal links. In one embodiment, the internal interfaces 208 and links are logical entities that are created and used for purposes of maintaining the links and hence, the topology between the logical routers 202. The internal interfaces 208 and links need not be actual physical interfaces and links. The significance of this will be elaborated upon in a later section.

To truly emulate the behavior of standalone routers, the logical routers 202 implement the same protocols as standalone routers. In one embodiment, this includes a forwarding protocol, and a routing protocol. By implementing a forwarding protocol (such as IP), each logical router 202 is able to receive packets from, and forward packets to, other routers. By implementing a routing protocol, each logical router 202 is able to exchange topology information with the rest of the routers in the network 200.

For example, using a routing protocol, logical router A 202a can advertise that it has a link to router E 102e, a link to router D 102d, a link to logical router B 202b, and a link to logical router C 202c. Logical router C 202c can advertise that it has a link to router H 102h, a link to router I 102, and a link to logical router A 202a. Logical router B 202b can advertise that it has a link to router F 102f, a link to router G 102g, and a link to logical router A 202a. In one embodiment, when advertising its links, a logical router 202 does not distinguish between an internal link and an external link. Thus, to all routers 102 external to the physical router 204, it appears that there is a physical link between logical router A 202a and logical router B 202b, and a physical link between logical router A 202a and logical router C 202c. Thus, to the external routers 102, the logical routers 202 appear to be interconnected standalone routers.

In one embodiment, the routing information advertised by the logical routers 202 is propagated to all routers, including the logical routers 202 themselves. Thus, even to the logical routers 202, it appears that there is a link between logical router A 202a and logical router B 202b, and between logical router A 202a and logical router C 202c. As a result, from a protocol and topology standpoint, the logical routers 202 truly do appear to be interconnected standalone routers. (Note: having interconnected logical routers 202 does not preclude each logical router 202 from also supporting multiple virtual routers as described in the background section.)

Although they emulate standalone routers, the logical routers 202 are ultimately implemented within a single physical router 204. Because of this fact, certain efficiencies can be gained when routing sets of information (e.g. packets). To illustrate this point, reference will be made to the forwarding example discussed previously.

Suppose that router H 102h needs to forward a packet having an IP address indicating that the destination router is router G 102g. According to the topology of network 200, this packet should be forwarded from router H 102h to logical router C 202c to logical router A 202a to logical router B 202b to router G 102g. Notice though that from the point of view of the physical router 204, the packet simply enters the physical router 204 at external interface 206(1) and exits the physical router 204 at external interface 206(3). If, instead of routing the packet from logical router C 202c to logical router A 202a to logical B 202b, the packet is directly routed from external interface 206(1) to external interface 206(3), significant efficiencies can be gained.

In one embodiment, the logical routers 202 are endowed with the ability to determine whether the next hop of a packet is to a logical router 202 or to an external router 102. If the next hop is to a logical router 202, then the logical router 202 receiving the packet does not forward the packet to the next hop, but rather determines the next hop after that hop. This continues until a next hop is found that is to an external router 102. Once that hop is found, the packet is routed directly through the internal switching fabric of the physical router 204 to the external interface associated with that hop. In the present example, the packet is routed directly from the external interface 206(1) associated with logical router C 202c to the external interface 206(3) associated with logical router B 202b. By routing the packet in this way, the intermediate forwarding between logical router C 202c and logical router A 202, and between logical router A 202a and logical router B 202b is bypassed. By implementing "bypass" routing in this manner, the logical routers 202 realize significant efficiency gains.

The embodiment of the present invention discussed above provides the best of both worlds. On the one hand, it is able to emulate the behavior of interconnected standalone routers within a single physical router 204. On the other hand, it is able to take advantage of the fact that the logical routers 202 are not actual standalone routers, but rather are embodied in the same physical router 204, to carry out information routing more efficiently. By providing the best of both worlds, this embodiment represents a significant improvement over the virtual routers and multi-routers approaches discussed previously.

Sample Router Implementation

Figure 3:
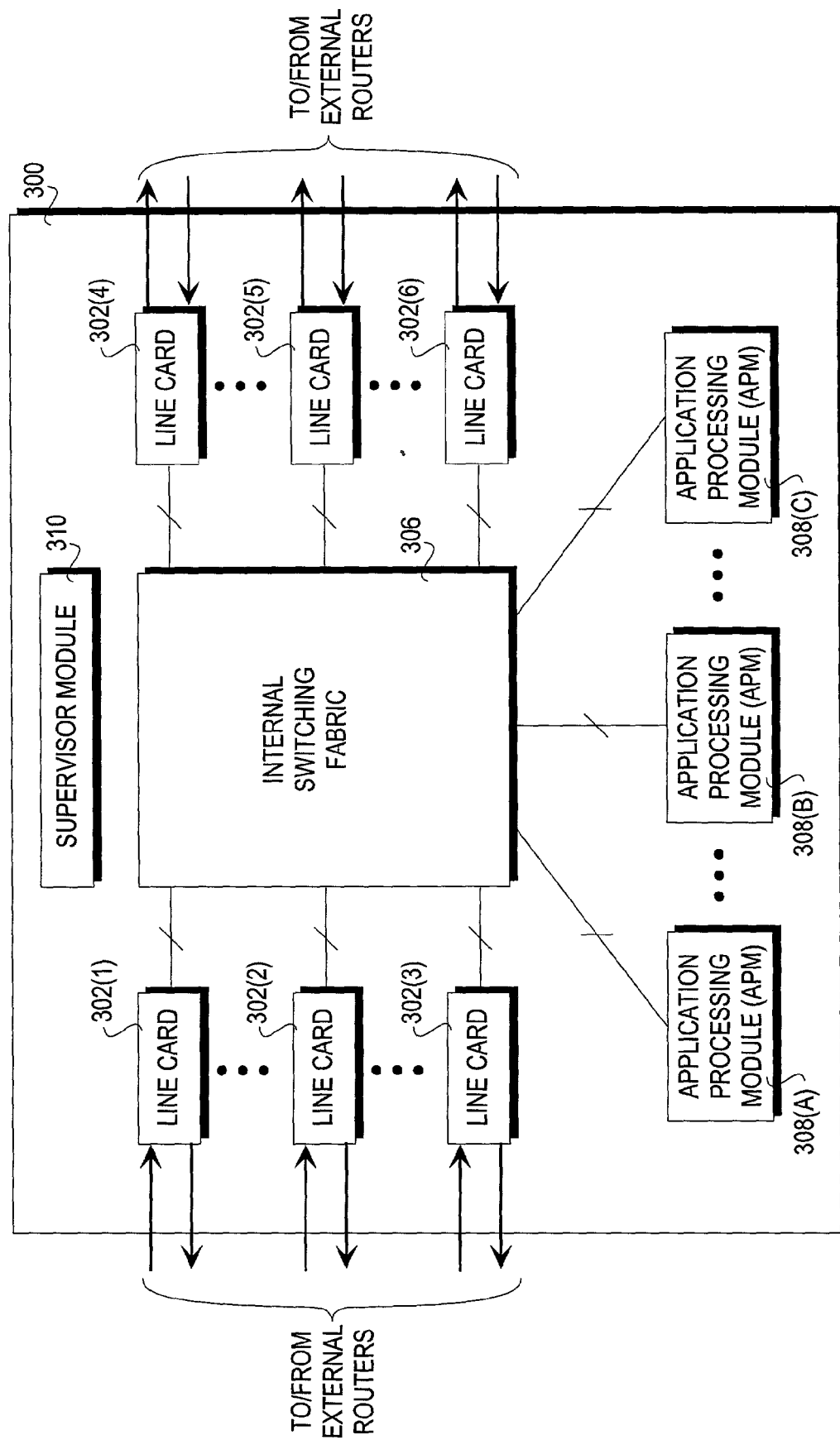
FIG. 3 is a functional diagram of a sample router in which one embodiment of the present invention may be implemented.

With reference to FIG. 3, there is shown a sample router 300 in which one embodiment of the present invention may be implemented. Router 300 may be used as physical router 204 of FIG. 2 to implement the logical routers A, B, and C 202a, 202b, 202c. As shown in FIG. 3, router 300 comprises a plurality of line cards 302, an internal switching fabric 306, a plurality of application processing modules (APM) 308, and a supervisor module 310. Each line card 302 and each APM 308 is coupled to the switching fabric 306. In addition, the supervisor module 310, the lines cards 302, and the APM's 308 are all coupled to each other via an underlying network (not shown), such as an Ethernet network.

Line Cards

In router 300, the line cards 302 act as the external interfaces of the router 300. More specifically, the line cards 302 enable the router 300 to be coupled to one or more external routers 102. As an example, if router 300 is used to implement the physical router 204 of FIG. 2, then line card 302(1) may be used as external interface 206(1), line card 302(2) may be used as external interface 206(2), line card 302(3) may be used as external interface 206(3), line card 302(4) may be used as external interface 206(4), line card 302(5) may be used as external interface 206(5), and line card 302(6) may be used as external interface 206(6).

The line cards 302 may be coupled to the external routers via external links or trunks (e.g. optical fiber lines, coaxial cables, etc.). In one embodiment, the trunks coupled to the line cards 302 are bi-directional; thus, each line card 302 may receive information from another router, or send information to another router. Put another way, each line card 302 is capable of acting as an ingress line card (to receive information) or an egress line card (to send information).

The line cards 302 are coupled to each other within the router 300 by the internal switching fabric 306. Basically, the switching fabric 306 provides a mechanism for coupling any line card 302 to any other line card 302 so that information can be transported from any ingress line card 302 to any egress line card 302. By transporting information from an ingress line card 302 to an egress line card 302, the switching fabric 306 routes information through the router 300 and sends it on its way to the next router.

In one embodiment, to increase the fault tolerance of the router 300, each line card 302 has multiple connections to the switching fabric 306, as shown. In addition, the switching fabric 306 provides multiple switch fabric paths between each ingress line card 302 and each egress line card 302. By providing multiple switch fabric paths between the various line cards 302, the switching fabric 306 makes it possible to route around any internal failures that may arise.

Figure 4:
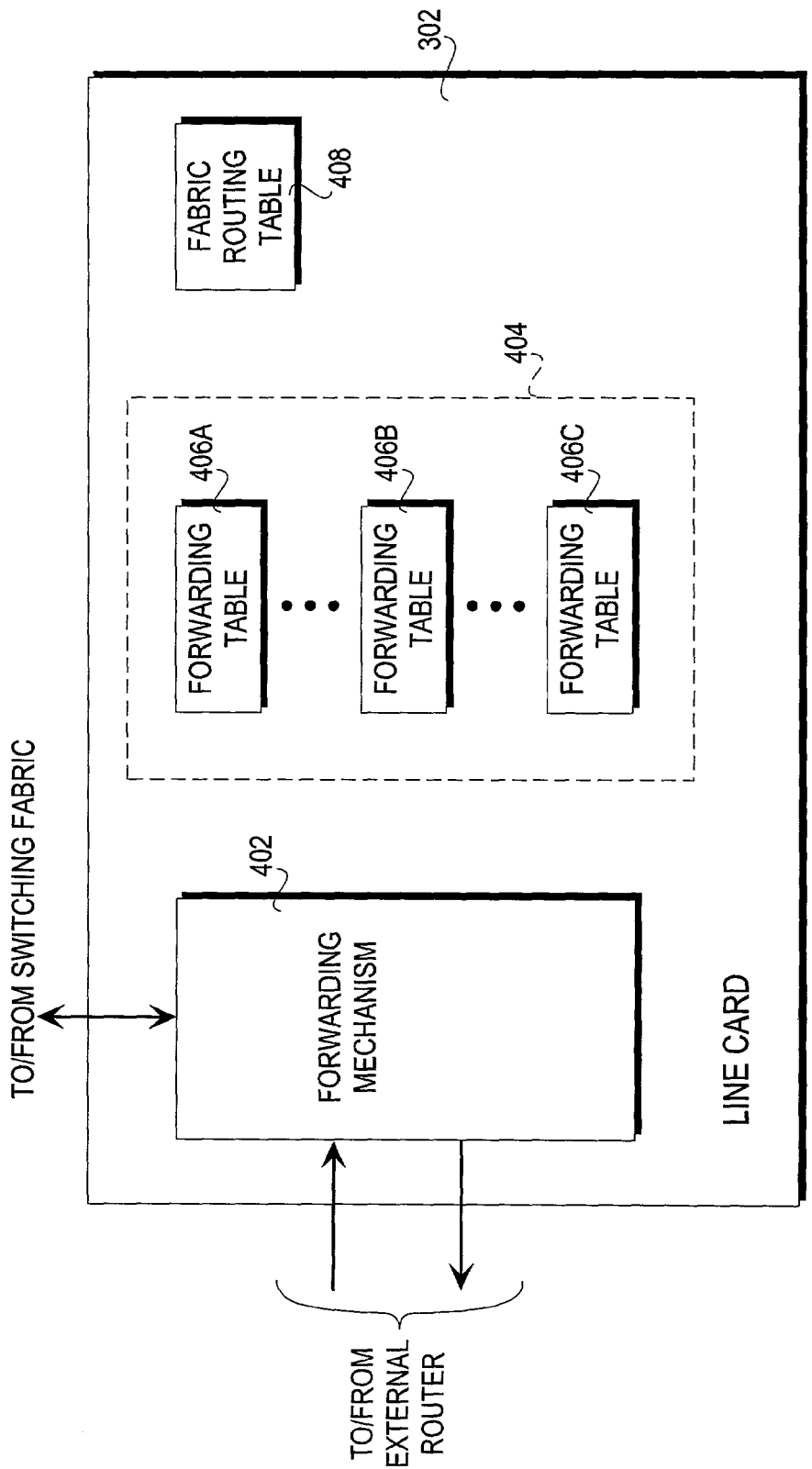
FIG. 4 is a functional diagram of a line card within the router of FIG. 3 in accordance with one embodiment of the present invention.

In one embodiment, the forwarding function of the router 300 is distributed among the various line cards 302. Put another way, the forwarding function of the router 300 is not centralized in any one component. Rather, it is up to each individual line card 302 to receive a set of information (e.g. a packet), make a forwarding decision as to which other line card 302 should be the egress line card 302, and then to forward the packet to the egress line card 302. To enable each line card 302 to carry out this forwarding function, each line card 302 is provided with forwarding functionality and a plurality of tables. A functional diagram of a line card 302 in accordance with one embodiment of the present invention is shown in FIG. 4.

As shown, a line card 302 comprises a forwarding mechanism 402, a set of one or more forwarding tables 404, and a fabric routing table 408. The forwarding mechanism 402 is coupled to the internal switching fabric 306, and to an external router. The forwarding mechanism 402 may receive a packet from the switching fabric 306 and forward it on to the external router, or it may receive a packet from the external router and forward it on to an egress line card 302 through the switching fabric 306. In carrying out its forwarding functions, the forwarding mechanism 402 implements a forwarding protocol (e.g. IP). For purposes of the present invention, forwarding mechanism 402 may implement any desired forwarding protocol. Because it implements a forwarding protocol, the forwarding mechanism 402 knows the format of the packet, the addressing scheme, etc. For purposes of the present invention, the functionality of the forwarding mechanism 402 may be implemented in various ways. For example, forwarding mechanism 402 may be implemented using hardwired circuitry (e.g. one or more ASIC's), or by way of one or more processors executing software. These and other implementations of the forwarding mechanism 402 are within the scope of the present invention.

In forwarding a packet from an external router to an egress line card 302, the forwarding mechanism 402 references the set 404 of one or more forwarding tables 406. In one embodiment, the set 404 of forwarding tables 406 comprises a forwarding table for each logical router 202 implemented within the router 300. In the current example, three logical routers A, B, and C are implemented within router 300; thus, the set 404 of forwarding tables comprises a forwarding table 406a corresponding to logical router A 202a, a forwarding table 406b corresponding to logical router B 202b, and a forwarding table 406c corresponding to logical router C 202c. In one embodiment, the forwarding tables 406 are provided to each of the line cards 302 by the APM's 308. More will be said about this in a later section. In one embodiment, each logical router 202 may have more than one forwarding table, e.g. a forwarding table for IP, one for MPLS, one for frame relay, one for ATM, etc.

Each forwarding table 406 contains information that can be used to determine a "next hop" for a packet. In one embodiment, a forwarding table 406 comprises at least two columns: (1) an "address" column; and (2) a "next hop" column. The address column stores an address, such as an IP address, to which a set of information or packet is destined. The next hop column stores information specifying the next hop for the packet if the packet has that address. In one embodiment, the information in the next hop column takes the form of an interface identifier. Basically, the next hop column tells the forwarding mechanism 402 the egress interface to which it should forward the packet. In a router 300 in which logical routers 202 are implemented, the egress interface may be an external interface 206 (such as an egress line card 302) (FIG. 3), or an internal interface 208 (FIG. 2).

To illustrate the contents of a forwarding table 406, reference will be made to an example. Suppose that there is an IP address X that corresponds to router G 102g. That is, all packets having address X should be routed to router G 102g. In such a case, the forwarding table 406c corresponding to logical router C 202c would have an entry with the address X in the address column. In the next hop column of that same entry, the forwarding table 406c would have the identifier for internal interface 208(1) (see FIG. 2). This indicates that, for logical router C 202c, to forward a packet to address X, the packet should be forwarded to internal interface 208(1) (i.e. that interface 208(1) should be the egress interface). Forwarding table 406c is shown in FIG. 5A.

Likewise, the forwarding table 406a corresponding to logical router A 202a would also have an entry with the address X in the address column. In the next hop column of that same entry, the forwarding table 406a would have the identifier for internal interface 208(3) to indicate that, for logical router A 202a, to forward a packet to address X, the packet should be forwarded to interface 208(3) (i.e. that interface 208(3) should be the egress interface). Forwarding table 406a is shown in FIG. 5B.

Finally, the forwarding table 406b corresponding to logical router B 202b would also have an entry with the address X in the address column. In the next hop column of that same entry, the forwarding table 406b would have the identifier for external interface 206(3) to indicate that, for logical router B 202b, to forward a packet to address X, the packet should be forwarded to external interface 206(3). Forwarding table 406b is shown in FIG. 5C. As this example illustrates: (1) a forwarding table 406 for a logical router can be used to determine an egress interface for a particular address; and (2) the forwarding table 406 for each logical router 202 is different.

In one embodiment, the identifiers in the next hop column of the forwarding tables 406 are formatted in such a way that it is possible to distinguish between an external interface 206 and an internal interface 208. For example, the identifiers for external interfaces 206 may have a certain value range whereas the identifiers for internal interfaces 208 may have a different value range. This makes it easy for the forwarding mechanism 402 to tell whether the next router is a logical router 202 or an external router 102. In addition, in one embodiment, if the identifier is an identifier of an internal interface 208, the identifier also includes some information indicating the logical router 202 to which that internal interface is linked. For example, in the forwarding table 406c of logical router C 202c shown in FIG. 5A, in the entry that contains the identifier for internal interface 208(1), there is some information indicating that internal interface 208(1) is linked to logical router A 202a. As will be elaborated upon below, this information makes it easy for the forwarding mechanism 402 to carry out bypass routing.

In one embodiment, to improve routing efficiency within the router 300, the forwarding mechanism 402 of each of the line cards 320 is endowed with the ability to perform bypass routing. To illustrate how bypass routing may be implemented in accordance with one embodiment of the present invention, reference will be made to FIGS. 2-5, and to the forwarding example used previously. Specifically, suppose that a packet having address X is to be forwarded from router H 102h to router G 102g. Suppose further that line cards 302(1)-302(6) of router 300 are used as the external interfaces 206(1)-206(6) of FIG. 2, respectively.

In this forwarding example, the packet starts its travel through the network 200 by going from router H 102h to logical router C 202c via external interface 206(1) (line card 302(1) in this example). Upon receiving the packet, the forwarding mechanism 402 of line card 302(1) consults the forwarding table 406c (FIG. 5A) of logical router C 202c. According to this table 406c, for address X, the next hop or egress interface is internal interface 208(1); thus, the forwarding mechanism 402 obtains from the forwarding table 406c the identifier for internal interface 208(1). As noted above, this identifier is formatted in such a way that the forwarding mechanism 402 can tell that it is an internal interface 208. In addition, the identifier also comprises information indicating that logical router A 202a is the logical router to which the interface 208(1) is linked. Thus, the forwarding mechanism 402 knows that the next router is a logical router 202, and that the logical router is logical router A 202a.

In one embodiment, if forwarding mechanism 402 determines that the next router is a logical router 202, it does not forward the packet to that router. Instead, it proceeds to determine the next hop for the packet. In this example, to determine the next hop, the forwarding mechanism 402 consults the forwarding table 406a (FIG. 5B) of logical router A 202a (since logical router A 202a is the next router). According to forwarding table 406a, for address X, the next hop or egress interface is internal interface 208(3); thus, the forwarding mechanism 402 obtains from the forwarding table 406a the identifier for internal interface 208(3). Based on this identifier, the forwarding mechanism 402 knows that interface 208(3) is an internal interface, and that the next router is logical router B 202b. Thus, forwarding mechanism 402 again does not forward the packet to logical router B 202b, but rather proceeds to determine the next hop.

In this example, to determine the next hop, the forwarding mechanism 402 consults the forwarding table 406b (FIG. 5C) of logical router B 202b (since logical router B 202b is the next router). According to forwarding table 406b, for address X, the next hop or egress interface is external interface 206(3) (line card 302(3) in this example). Since this is an external interface, forwarding mechanism 402 knows that the next router is an external router 102, not a logical router 202. Thus, it knows that this external interface is the egress from the router 300 (i.e. that it is the egress line card).

After it obtains the identifier of the egress line card 302(3), the forwarding mechanism 402 of the ingress line card 302(1) determines a route that the packet can take through the switching fabric 306 to get to the egress line card 302(3). In one embodiment, the forwarding mechanism 402 determines the route by consulting the fabric routing table 408. Basically, the fabric routing table 408 comprises one or more possible routes through the switching fabric 306 to each of the other line cards 302 in the router 300. The forwarding mechanism 402 selects from the fabric routing table 408 one of the possible routes to the egress line card 302(3). Once the route is determined, the forwarding mechanism 402 forwards the packet to the egress line card 302(3) using that route. In this manner, the packet is forwarded directly from the ingress line card 302(1) to the egress line card 302(3). The intermediate hops and logical routers 202a are bypassed. By implementing bypass routing, the forwarding mechanism 402 of the ingress line card 302(1) takes advantage of the fact that the logical routers 202 are implemented in the same physical router, and achieves routing efficiency gains as a result.

Supervisor Module

With reference to FIG. 5, there is shown a functional diagram of the supervisor module 310 of router 300 in accordance with one embodiment of the present invention. As shown, supervisor module 310 comprises a fabric topology manager 602 and a provisioning module 604. For purposes of the present invention, the functionality of the fabric topology manager 602 and the provisioning module 604 may be implemented in various ways. For example, their functionality may be implemented using hardwired circuitry (e.g. one or more ASIC's). Alternatively, their functionality may be implemented by way of one or more processors executing software. These and other implementations are within the scope of the present invention.

In one embodiment, the fabric topology manager 602 is responsible for generating and providing the fabric routing table 408 (FIG. 4) to each of the lines cards 302 in the router 300. As noted above, this routing table 408 is used by the forwarding mechanism 402 of a line card 302 to determine a route through the switching fabric 306 to another line card 302 in the router 300. A point to note regarding fabric routing table 408 is that it is unique to each line card 302. That is, each line card 302 has a different fabric routing table 408. This is because the routing table 408 specifies the potential routes from a particular line card 302 (i.e. the line card on which the routing table 408 is stored) to every other line card 302 in the router 300. Since the routes to a line card 302 will differ depending upon the starting line card, each line card 302 has different routes to every other line card 302. Thus, the routing table 408 will vary from line card 302 to line card 302.

Accordingly, fabric topology manager 602 custom-generates a different fabric routing table 408 for each line card 302. The fabric topology manager 602 generates the fabric routing table 408 based upon its knowledge of the topology of the internal switching fabric 306, and based upon certain criteria. For example, the fabric topology manager 602 may include a route in the fabric routing table 408 because it is the shortest route, because the route has the least traffic, or because of some other criteria. For purposes of the present invention, the fabric topology manager 602 may use any criteria in determining which routes to include in fabric routing table 408. In one embodiment, the fabric topology manager 602 includes a plurality of routes to each line card 302. That way, if one route fails, another route may be taken. Once the fabric topology manager 602 generates a fabric routing table 408 for a particular line card 302, it sends the table 408 to that line card 302 via the underlying network (not shown). The fabric topology manager 602 repeats this process until a fabric routing table 408 is provided to each line card 302 in the router 300. In the embodiment just described, the fabric topology manager 602 generates and provides the fabric routing tables 408 to the line cards 302. In an alternative embodiment, the fabric topology manager 602 may compute the fabric topology of the internal switching fabric 306, and then send that topology information to each line card 302. Each line card 302 may thereafter use that topology information to generate its own fabric routing table 408. This and other alternative implementations are within the scope of the present invention.

Figure 6:
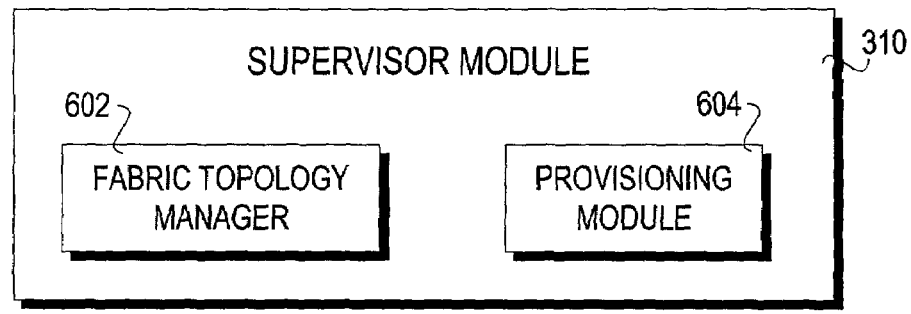
FIG. 6 is a functional diagram of a supervisor module within the router of FIG. 3 in accordance with one embodiment of the present invention.

In one embodiment, the provisioning module 604 is the module that interacts with a user to set up the logical routers 202 within the physical router 300. By invoking the provisioning module 604, a user can establish logical routers 202, establish the external interfaces 206 and internal interfaces 208 of each logical router 202, and establish the external and internal links of each logical router 202. Basically, the provisioning module 604 enables a user to set up the topology of the logical routers 202. In the embodiment shown in FIG. 6, the provisioning module 604 is depicted as a module residing on the supervisor module 310. It should be noted though, that if so desired, the functionality of the provisioning module 604 may be distributed among the plurality of APM's 308 (that is, each APM 308 may comprise provisioning functionality to enable itself to be provisioned). This and other alternative implementations of the provisioning module 604 are within the scope of the present invention. To illustrate how the provisioning module 604 operates, reference will be made to an example.

Suppose that it is desirable to set up logical routers A, B, and C as shown in FIG. 2. Suppose further that it is desirable to use APM 308(a) (FIG. 3) to implement functionality for logical router A 202a, APM 308(b) to implement functionality for logical router B 202b, and APM 308(c) to implement functionality for logical router C 202c. Suppose further that line cards 302(1)-302(6) are to be used as external interfaces 206(1)-206(6), respectively. Given these suppositions, one embodiment of the provisioning module 604 operates as follows. In the following discussion, it will be assumed that the provisioning module 604 is acting in response to instructions from a user.

Initially, provisioning mechanism 604 establishes logical router A 202a. To do so, provisioning module 604 assigns APM 308(a) to act as the APM for logical router A 202a. Provisioning module 604 then establishes the external interfaces 206(5) and 206(6) of logical router A 202a. To do so, provisioning module 604 informs APM 308(a) that its associated external interfaces are line cards 302(5) and 302(6), and provides the identifiers for these line cards 302(5), 302(6) to the APM 308(a). Together, the APM 308(a) and the line cards 302(5), 302(6) form the physical components of logical router A 202a. Thereafter, provisioning module 604 establishes the external links between line card 302(5) and external router D 102d, and between line card 302(6) and external router E 102e. The external interfaces and links of logical router A 202a are thus established.

To address the internal aspects of logical router A 202a, provisioning module 604 further establishes the internal interfaces 208(2) and 208(3). In one embodiment, these internal interfaces 208(2), 208(3) are not actual physical interfaces, but rather are logical entities that are created for purposes of establishing a topology between logical routers 202. These internal interfaces 208(2), 208(3) enable internal links to be established between logical router A 202a and one or more other logical routers 202. In establishing the internal interfaces 208(2), 208(3), the provisioning module 604 generates an identifier for each internal interface 208(2), 208(3). In one embodiment, the identifier for an internal interface 208 is different from the identifier for a line card 302. For example, the identifiers for line cards 302 may occupy a certain value range whereas the identifiers for internal interfaces 208 may occupy a different value range. This makes it easy to distinguish between an internal interface 208 and a line card 302. After establishing the internal interfaces 208(2), 208(3), the provisioning module 604 provides their identifiers to the APM 308(a). Once that is done, APM 308(a) knows: (1) that it is to implement functionality for logical router A 202a; (2) that its associated line cards are line cards 302(5) and 302(6); and (3) that it has internal interfaces 208(2) and 208(3). Logical router A 202a is thus established.

To establish logical router B 202b, provisioning module 604 follows a similar process. Specifically, provisioning module 604 assigns APM 308(b) to act as the APM for logical router B 202b. Provisioning module 604 then establishes the external interfaces 206(3) and 206(4) of logical router B 202b. To do so, provisioning module 604 informs APM 308(b) that its associated external interfaces are line cards 302(3) and 302(4), and provides the identifiers for these line cards 302(3), 302(4) to the APM 308(b). Together, the APM 308(b) and the line cards 302(3), 302(4) form the physical components of logical router B 202b. Thereafter, provisioning module 604 establishes the external links between line card 302(3) and external router G 102g, and between line card 302(4) and external router F 102f. The external interfaces and links of logical router B 202b are thus established.

To address the internal aspects of logical router B 202b, provisioning module 604 further establishes the internal interface 208(4). In doing so, provisioning module 604 generates an identifier for the internal interface 208(4), and provides this identifier to APM 308(b). After that is done, provisioning module 604 establishes the internal link between internal interface 208(4) and internal interface 208(3) of logical router A 202a. Like the internal interfaces 208, this internal link, in one embodiment, is not an actual physical link but rather is a logical entity that enables logical routers 202 to be logically connected. In one embodiment, after establishing this internal link, provisioning module 604 informs both APM 308(a) and APM 308(b) of the link so that both will advertise the link when exchanging routing information. After that is done, APM 308(b) knows: (1) that it is to implement functionality for logical router B 202b; (2) that its associated line cards are line cards 302(3) and 302(4); (3) that it has internal interface 208(4); and (4) that it has an internal link to logical router A 202a (logical router A 202a knows this as well). Logical router B 202b is thus established.

Similarly, to establish logical router C 202c, provisioning module 604 assigns APM 308(c) to act as the APM for logical router C 202c. Provisioning module 604 then establishes the external interfaces 206(1) and 206(2) of logical router C 202c. To do so, provisioning module 604 informs APM 308(c) that its associated external interfaces are line cards 302(1) and 302(2), and provides the identifiers for these line cards 302(1), 302(2) to the APM 308(c). Together, the APM 308(c) and the line cards 302(1), 302(2) form the physical components of logical router C 202c. Thereafter, provisioning module 604 establishes the external links between line card 302(1) and external router H 102h, and between line card 302(2) and external router I 102i. The external interfaces and links of logical router C 202c are thus established.

To address the internal aspects of logical router C 202c, provisioning module 604 establishes the internal interface 208(1). In doing so, provisioning module 604 generates an identifier for the internal interface 208(1), and provides this identifier to APM 308(c). After that is done, provisioning module 604 establishes the internal link between internal interface 208(1) and internal interface 208(2) of logical router A 202a. In one embodiment, provisioning module 604 informs both APM 308(a) and APM 308(c) of this internal link so that both will advertise the link when exchanging routing information. After that is done, APM 308(c) knows:

(1) that it is to implement functionality for logical router C 202c; (2) that its associated line cards are line cards 302(1) and 302(2); (3) that it has internal interface 208(1); and (4) that it has an internal link to logical router A 202a (logical router A 202a knows this as well). Logical router C 202c is thus established. In the manner described, provisioning module 604 sets up the topology of the logical routers 202. Once that is done, the logical routers 202 (and more specifically, the APM's 308) can exchange routing information with each other and with the external routers 102 to behave like interconnected standalone routers.

In the above example, it was assumed that there is a one-to-one correspondence between an APM 308 and a logical router 202. That is, one APM 308(a) was assigned to implement functionality for logical router A 202a, one APM 308(b) was assigned to implement functionality for logical router B 202b, and one APM 308(c) was assigned to implement functionality for logical router C 202c. It should be noted that this assumption was made solely for the sake of simplicity and illustration. The invention is not so limited. If so desired, more than one APM 308 may be assigned to provide functionality for a single logical router 202. Additionally, a single APM 308 may be assigned to provide functionality for more than one logical router 202. These and other implementations are within the scope of the present invention.

Application Processing Modules (APM)

Figure 7:
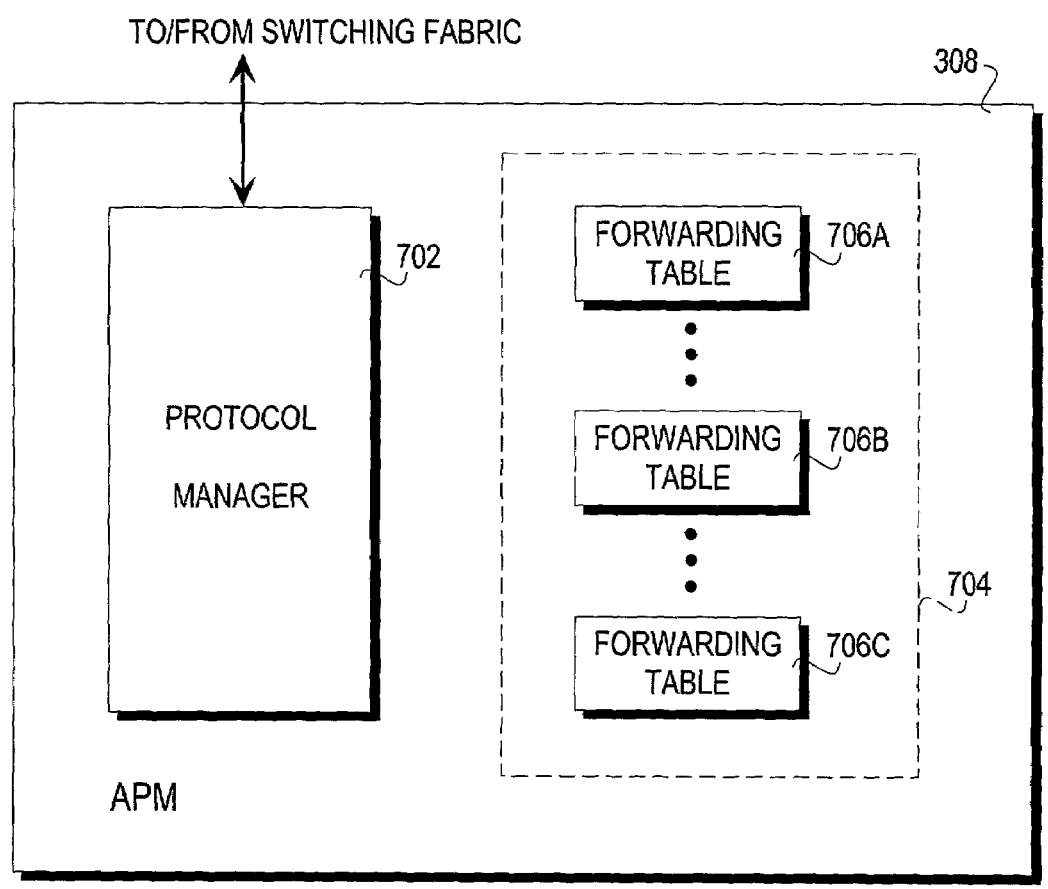
FIG. 7 is a functional diagram of an application processing module within the router of FIG. 3 in accordance with one embodiment of the present invention.

With reference to FIG. 7, there is shown a functional diagram of an APM 308 in accordance with one embodiment of the present invention. As shown, APM 308 comprises a protocol manager 702 and a set 704 of one or more forwarding tables 706. In one embodiment, the protocol manager 702 implements a routing protocol. For purposes of the present invention, protocol manager 702 may implement any desired routing protocol, including but not limited to IS-IS, BGP, OSPF, etc. The functionality of protocol manager 702 may be implemented in various ways. For example, the protocol manager's functionality may be implemented using hardwired circuitry (e.g. one or more ASIC's). Alternatively, its functionality may be implemented by way of one or more processors executing software. These and other implementations are within the scope of the present invention. In one embodiment, there may be multiple protocol managers 702 on each APM 308, with each protocol manager 702 implementing a different routing protocol. In such a case, each APM 308 would also comprise a master routing table which combines the routing information from all of the routing protocols.

As noted, one of the functions of protocol manager 702 is to implement a routing protocol. The routing protocol enables the protocol manager 702 to exchange topology information with the other routers (both external routers and logical routers) in the network 200. Before it can implement the routing protocol, however, the protocol manager 702 first needs to know its surrounding topology. As discussed above in connection with the provisioning module 604 (FIG. 6), this topology information is provided by the provisioning module 604. Specifically, the provisioning module 604 informs the protocol manager 702: (1) the logical router 202 to which the APM 308 has been assigned; (2) the external interfaces (e.g. the line cards 302) that are associated with that logical router; (3) the internal interfaces that have been established for that logical router; and (4) the links (both internal and external) that have been established between each interface (both internal and external) and the other routers (whether external or logical routers).

For example, suppose that the APM 308 of FIG. 7 is APM 308(a) of FIG. 3. Suppose further that APM 308(a) has been assigned to implement functionality for logical router A 202a (FIG. 2). Suppose further that line cards 302(5) and 302(6) are to be used as external interfaces 206(5) and 206(6), respectively. In such a case, the provisioning module 604 informs the protocol manager 702 that: (1) APM 308 has been assigned to implement functionality for logical router A 202a; (2) lines cards 302(5) and 302(6) are the associated external interfaces for logical router A 202a (the provisioning module 604 provides the identifiers for these line cards); (3) internal interfaces 208(2) and 208(3) have been established for logical router A 202a (the provisioning module 604 provides the identifiers for these internal interfaces); and (4) line card 302(6) is linked to external router E 202e, line card 302(5) is linked to external router D 202d, internal interface 208(3) is linked to logical router B 202b, and internal interface 208(2) is linked to logical router C 202c.

Once the protocol manager 702 has its local topology information, it implements the routing protocol to advertise its local topology to the rest of the network 200. To advertise its topology information to external routers 102, the protocol manager 702 uses its associated line cards 302. To advertise the topology information to other logical routers 202, the topology manager 702 sends the topology information to the APM's 308 that implement functionality for those logical routers 202. For example, if APM's 308(a), 308(b), and 308(c) implement functionality for logical routers A, B, and C, respectively, then the protocol manager 702 on these APM's 308(a), 308(b), and 308(c) send topology information to each other.

In one embodiment, in advertising its local topology, the protocol manager 702 does not distinguish between an internal link and an external link. Thus, to all external routers 102, it appears that all of the links (including the internal links) advertised by the protocol manager 702 are physical links. Thus, to the external routers 102, it appears that the logical routers 202 are interconnected standalone routers.

Also, as noted above, the routing information advertised by the protocol manager 702 is propagated to all routers, including the logical routers 202 (more specifically, is propagated to all other APM's 308 that implement functionality for other logical routers 202). Thus, even to the APM's 308, and hence, the logical routers 202 themselves, it appears that there is one or more links between the logical routers 202. As a result, from a protocol and topology standpoint, the logical routers 202 truly do appear, both to external routers 102 and to each other, to be interconnected standalone routers.

In addition to advertising its own topology information, the protocol manager 702 also receives topology information from other routers, both external routers 102 and logical routers 202. Using this topology information, the protocol manager 702 constructs one of the forwarding tables 706. In one embodiment, the protocol manager 702 constructs the forwarding table 706 for its corresponding logical router 202. For example, if the APM 308 of FIG. 7 has been assigned to implement functionality for logical router A 202a, then the protocol manager 702 will construct the forwarding table 706a corresponding to logical router A 202a.

In constructing a forwarding table 706, the protocol manager 702 uses the identifiers for the associated line cards 302 and the internal interfaces 208 that it received from the provisioning module 604. These identifiers are inserted into the forwarding table 706, along with the appropriate addresses. In one embodiment, when the protocol manager 702 inserts an internal interface identifier into the forwarding table 706, it includes with that identifier some information indicating the logical router 202 to which that internal interface is linked. That way, when the forwarding mechanism 402 of a line card 302 later looks at that identifier, it can quickly determine which logical router 202 is the next router.

In one embodiment, after it constructs the forwarding table 706, the protocol manager 702 broadcasts the information in the forwarding table 706 to all of the line cards 302 and all of the other APM's 308. Thus, all line cards 302 and all APM's 308 will have a copy of the information in the forwarding table 706.

In one embodiment, all of the other APM's 308 will also broadcast information in their forwarding tables 706 to all line cards 302 and all APM's 308. Thus, even though APM 308 of FIG. 7 constructs only one of the forwarding tables 706, it has information pertaining to the forwarding tables 706 of all of the logical routers 202 implemented in the physical router 300. After information in all of the forwarding tables 706 is supplied to all of the line cards 302, the line cards 302 are ready to operate in the manner described previously.

Alternative Embodiment

In the embodiment described above, each line card 302 stores a forwarding table 406 (FIG. 4) corresponding to each logical router 202 implemented in the physical router 300. These tables 406 are traversed by the forwarding mechanism 402 to implement bypass routing, as described previously. While this is an effective embodiment, it is not the only one. Many alternative embodiments are possible.

Figure 8:
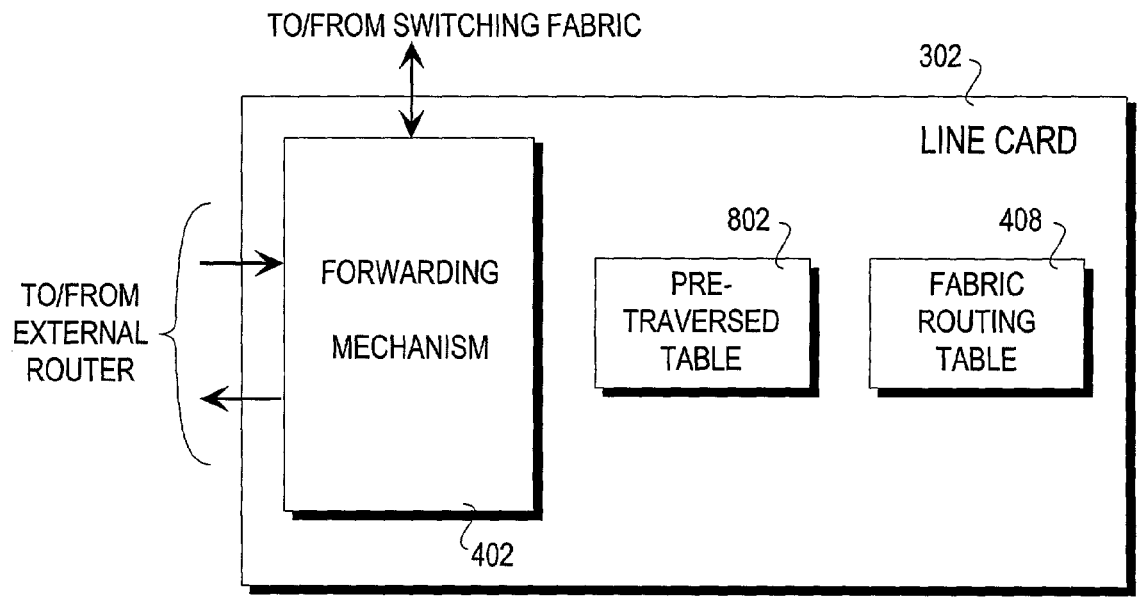
FIG. 8 is a functional diagram of a line card in which multiple forwarding tables have been replaced with a pre-traversed table in accordance with one embodiment of the present invention.

One possible alternative is to pre-traverse the forwarding tables 406 to derive a pre-traversed table, and then to store just the pre-traversed table on the line card 302. Put another way, rather than traversing the forwarding tables 406 at the time of forwarding a packet, the forwarding tables 406 are pre-traversed. The results of the pre-traversal are stored into a pre-traversed table, and it is this pre-traversed table that is used by the forwarding mechanism 402 to forward packets. A functional diagram of one embodiment of a line card 302 in which the multiple forwarding tables 406 are replaced by a pre-traversed table 802 is shown in FIG. 8. By having each line card 302 store and traverse only one pre-traversed table 802, storage requirements on the line card 302 are reduced, and forwarding performance is improved (fewer table traversals lead to faster routing decisions).

To illustrate how multiple forwarding tables may be pre-traversed, reference will be made to the sample forwarding tables shown in FIGS. 5A-5C, wherein the forwarding table 406c corresponds to logical router C 202c, forwarding table 406a corresponds to logical router A 202a, and forwarding table 406b corresponds to logical router B 202b. Each of these routing tables 406 specifies the next hop for a certain logical router 202 given the address X. Recall that these forwarding tables 406 were used to forward a packet having address X from router H 102h to router G 102g. In this example, traversal begins with forwarding table 406c.

Given address X, the identifier for internal interface 208(1) is obtained from table 406c. From this identifier, it is determined that the next hop is a logical router 202, and that the next logical router is logical router A 202a. Thus, the next forwarding table to be accessed is forwarding table 406a. From this table, the identifier for internal interface 208(3) is obtained. From this identifier, it is determined that the next hop is also a logical router 202, and that the next logical router is logical router B 202b. Thus, the next forwarding table to be accessed is forwarding table 406b. From this table, the identifier for external interface 206(3) is obtained. From this identifier, it is determined that the next hop is an external router, not a logical router. Thus, table traversal stops. As this example shows, the object of the traversal process is to obtain an identifier for an external interface given a particular address. Once this external interface identifier is obtained, the identifier and the address may be stored in a separate pre-traversed table. An indication of the number of forwarding tables that were accessed to obtain the external interface identifier may also be stored in the pre-traversed table. This pre-traversed table may thereafter be used to obtain the external interface identifier rather than traversing the separate forwarding tables 406. Therefore, by pre-traversing multiple forwarding tables 406 in the manner described, a pre-traversed table can be derived which can replace the multiple forwarding tables 406.

Figure 9:
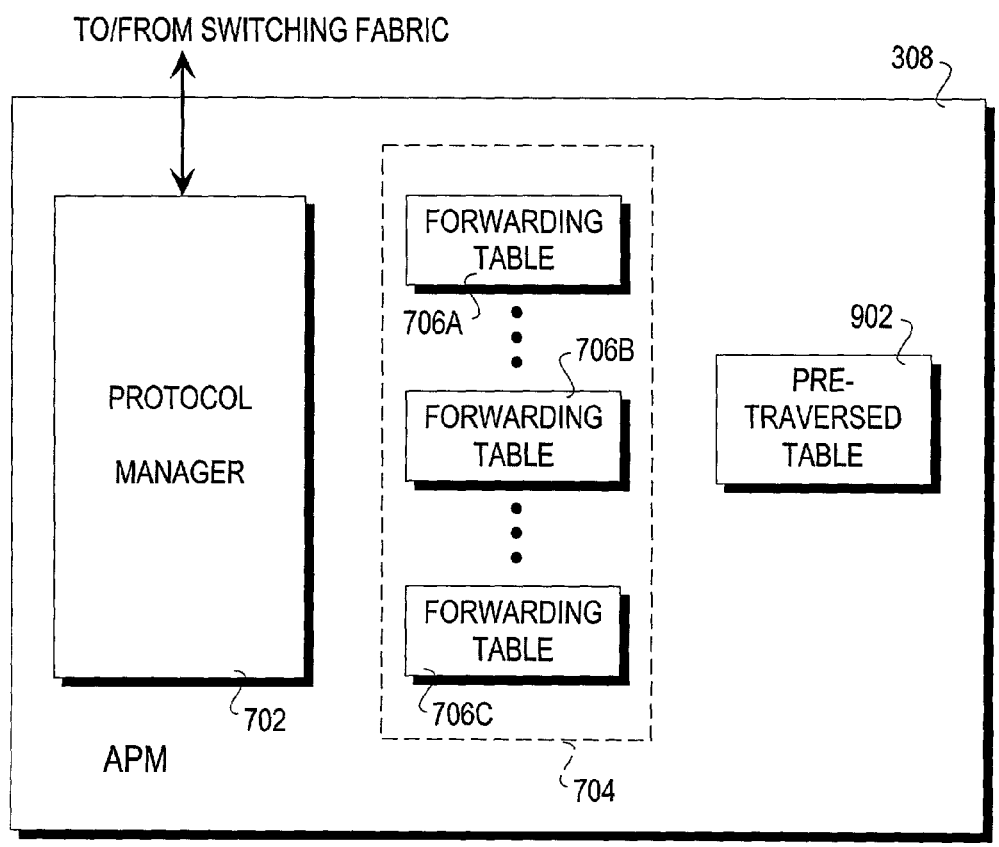
FIG. 9 is a functional diagram of an application processing module in which a pre-traversed table is generated in accordance with one embodiment of the present invention.

In one embodiment, generation of pre-traversed tables is the responsibility of the APM's 308. More specifically, the APM 308 assigned to implement functionality for a particular logical router 202 is responsible for deriving the pre-traversed table for that logical router 202. With reference to FIG. 9, there is shown a functional diagram of one embodiment of an APM 308 in which a pre-traversed table 902 is generated. To describe the operation of this APM 308, reference will be made to an example. In the following example, it will be assumed: (1) that three logical routers A, B, and C 202a, 202b, 202c are implemented within router 300; (2) that the topology of the logical routers 202a, 202b, 202c is that shown in FIG. 2; (3) that APM 308 has been assigned to implement functionality for logical router A 202a; and (4) that line cards 302(5) and 302(6) are used as the external interfaces 206(5) and 206(6), respectively, for logical router A 202a.

In this example, protocol manager 702 implements the routing protocol for logical router A 202a. In doing so, protocol manager 702 advertises topology information for logical router A 202a to the other routers in the network 200. In addition, protocol manager 702 receives topology information from other routers, and constructs the forwarding table 706a for logical router A 202a using this information. Forwarding table 706a is constructed in the same manner as that described previously. After forwarding table 706a is constructed, protocol manager 702 broadcasts the forwarding table 706a to the other APM's 308 (note: in this embodiment, the forwarding table 706a is not broadcasted to the line cards 302). In turn, protocol manager 702 receives the forwarding tables 706b and 706c corresponding to logical routers B and C 202b, 202c from the other APM's 308. Thus, protocol manager 702 stores and has access to the forwarding tables 706 of all of the logical routers 202 implemented within router 300.

Thereafter, protocol manager 702 proceeds to derive the pre-traversed table 902 for logical router A 202a. To do so, protocol manager 702 starts with the an address and an entry in the forwarding table 706a associated with logical router A 202a, and traverses the forwarding tables 706 in the manner described above until it obtains, for that address, an identifier for an external interface. Once this identifier is obtained, the identifier and the address are stored into an entry of the pre-traversed table 902. Also stored in this entry of the pre-traversed table 902 is an indication of how may forwarding tables 706 were accessed to obtain this external interface identifier. The pre-traversed table 902 is thus populated. Protocol manager 702 repeats this process until all of the addresses and entries in forwarding table 706a have been processed. At that point, derivation of the pre-traversed table 902 is complete.

Thereafter, protocol manager 702 broadcasts the information in the pre-traversed table 902 to its associated line cards 302. In this example, the line cards associated with logical router A 202s are line cards 302(5) and 302(6); thus, protocol manager 702 broadcasts the information in pre-traversed table 902 to these line cards 302(5), 302(6) (note: in this embodiment, protocol manager 702 does not broadcast the information in table 902 to all line cards 302). Once that is done, line cards 302(5) and 302(6) will be able to implement bypass routing using the information in pre-traversed table 902.

This example shows how the APM 308 assigned to implement functionality for logical router A 202*a* derives a pre-traversed table 902 for logical router A 202*a*, and how the information in that table 902 is broadcasted to the line cards associated with logical router A 202*a*. The APM's 308 assigned to logical routers B and C 202*b*, 202*c* may implement a similar process to derive the pre-traversed tables for their respective logical routers 202*b*, 202*c*, and to broadcast the information in those pre-traversed tables to their associated line cards 302.

For example, suppose now that APM 308 of FIG. 9 has been assigned to implement functionality for logical router B 202*b*, and that line cards 302(3) and 302(4) are used as the external interfaces 206(3) and 206(4), respectively, for logical router B 202*b*. In such a case, protocol manager 702 derives the pre-traversed table 902 for logical router B 202*b* by starting with an address and an entry in the forwarding table 706*b* associated with logical router B 202*b*, and traversing the forwarding tables 706 in the manner described above until it obtains, for that address, an identifier for an external interface. Once this identifier is obtained, the identifier and the address are stored into an entry of the pre-traversed table 902. Also stored into this entry of the pre-traversed table 902 is an indication of how many forwarding tables 706 were accessed to obtain this external interface identifier. Protocol manager 702 repeats this process until all of the addresses and entries in forwarding table 706*b* have been processed. At that point, derivation of the pre-traversed table 902 for logical router B 202*b* is complete. (Note: the pre-traversed table for logical router B 202*b* will be different from the pre-traversed table for logical router A 202*a* since the pre-traversed table for logical router B 202*b* was derived by starting with forwarding table 706*b* whereas the pre-traversed table for logical router A 202*a* was derived by starting with forwarding table 706*a*.)

Thereafter, protocol manager 702 broadcasts the information in the pre-traversed table 902 to the line cards 302 associated with logical router B 202*b*. In this example, the line cards associated with logical router B 202*b* are line cards 302(3) and 302(4); thus, protocol manager 702 broadcasts the information in pre-traversed table 902 to these line cards 302(3), 302(4). (note: in this embodiment, protocol manager 702 does not broadcast the information in table 902 to all line cards 302). Once that is done, line cards 302(3) and 302(4) will be able to implement bypass routing using the information in pre-traversed table 902.

In the manner described, all of the APM's 308 assigned to logical routers 202 derive pre-traversed tables, and provide those pre-traversed tables to their associated line cards 302. Once that is done, the line cards 302 will have the information that they need to implement bypass routing.

At this point, it should be noted that although the invention has been described with reference to specific embodiments, it should not be construed to be so limited. Various modifications may be made by those of ordinary skill in the art with the benefit of this disclosure without departing from the spirit of the invention. For example, the invention has been described with reference to a specific implementation in which three logical routers 202*a*, 202*b*, 202*c* having specific interconnections are implemented within a physical router. The invention is not so limited. Rather, the concepts taught herein may be used to implement any number of logical routers within a physical router, and to implement any interconnection configuration between the logical routers. Thus, the invention should not be limited by the specific embodiments used to illustrate it but only by the scope of the appended claims.

What is claimed is:

1. A router, comprising:
a first set of one or more components capable of being configured to implement a first logical router within said router;
a second set of one or more components capable of being configured to implement a second logical router within said router; and
a forwarding routing table that comprises an identifier that indicates an internal link is internal rather than an external link;
wherein said first and second sets of components comprise functionality for establishing said internal link between said first logical router and said second logical router and advertising said internal link to other routers external to said router such that said first and second logical routers appear to the other routers as interconnected standalone routers, wherein said internal link is a logical, non-physical entity.

2. The router of claim 1, wherein said first and second sets of components comprise functionality for implementing one or more routing protocols.

3. The router of claim 2, wherein said first and second sets of components comprise functionality for implementing one or more forwarding protocols.

4. The router of claim 1, wherein said first and second sets of components further comprise functionality for advertising said internal link to each other such that said first and second logical routers appear to each other as interconnected standalone routers.

5. The router of claim 1, wherein said first set of components comprises functionality for maintaining a first internal interface associated with said first logical router, wherein said first internal interface is a logical, non-physical entity.

6. The router of claim 5, wherein said second set of components comprises functionality for maintaining a second internal interface associated with said second logical router, wherein said second internal interface is a logical, non-physical entity.

7. The router of claim 6, wherein said first set of components comprises functionality for maintaining said internal link between said first internal interface and said second internal interface.

8. The router of claim 7, wherein said second set of components comprises functionality for maintaining said internal link between said second internal interface and said first internal interface.

9. The router of claim 1, wherein said first set of components comprises functionality for constructing a first forwarding table for said first logical router.

10. The router of claim 9, wherein said first set of components comprises functionality for maintaining a first internal interface associated with said first logical router, wherein said first internal interface is a logical, non-physical entity, and wherein said first forwarding table comprises an entry indicating said first internal interface as a next hop for a set of information.

11. The router of claim 9, wherein said first forwarding table comprises an entry indicating said second logical router as a next router for a set of information.

12. The router of claim 9, wherein said second set of components comprises functionality for constructing a second forwarding table for said second logical router.

13. The router of claim 12, wherein said second set of components comprises functionality for maintaining a second internal interface associated with said second logical router, wherein said second internal interface is a logical, non-physical entity, and wherein said second forwarding table comprises an entry indicating said second internal interface as a next hop for a set of information.

14. The router of claim 12, wherein said second forwarding table comprises an entry indicating said first logical router as a next router for a set of information.

15. The router of claim 12, wherein said first set of components comprises functionality for providing said first forwarding table to said second set of components, and wherein said second set of components comprises functionality for providing said second forwarding table to said first set of components.

16. The router of claim 15, wherein said first set of components comprises a first external interface associated with said first logical router, wherein said second set of components comprises a second external interface associated with said second logical router, wherein said first set of components comprises functionality for providing information in said first forwarding table to both said first and second external interfaces, and wherein said second set of components comprises functionality for providing information in said second forwarding table to both said first and second external interfaces.

17. The router of claim 15, wherein said first set of components comprises a first external interface associated with said first logical router, wherein said second set of components comprises a second external interface associated with said second logical router, wherein said first set of components comprises functionality for deriving a first pre-traversed table based at least partially upon said first and second forwarding tables, and wherein said first set of components comprises functionality for providing information in said first pre-traversed table to said first external interface.

18. The router of claim 17, wherein said second set of components comprises functionality for deriving a second pre-traversed table based at least partially upon said first and second forwarding tables, and wherein said second set of components comprises functionality for providing information in said second pre-traversed table to said second external interface.

19. The router of claim 18, wherein said first and second pre-traversed tables are different tables.

20. The router of claim 18, wherein information in said first pre-traversed table is not provided to said second external interface, and wherein information in said second pre-traversed table is not provided to said first external interface.

21. The router of claim 1, wherein said router further comprises:
means for configuring said first set of components to establish a first internal interface associated with said first logical router, wherein said first internal interface is a logical, non-physical entity;
means for configuring said second set of components to establish a second internal interface associated with said second logical router, wherein said second internal interface is a logical, non-physical entity; and
means for configuring said first and second sets of components to establish said internal link between said first internal interface and said second internal interface.

22. The router of claim 21, wherein the means for configuring said second set of components comprises:
means for assigning an identifier to said second internal interface which indicates that said second internal interface is an internal rather than an external interface.

23. The router of claim 1, wherein said first set of components comprises a first set of one or more processing modules capable of implementing functionality for said first logical router, and wherein said second set of components comprises a second set of one or more processing modules capable of implementing functionality for said second logical router.

24. The router of claim 23, wherein said first set of processing modules and said second set of processing modules are the same set of processing modules.

25. The router of claim 23, wherein said first set of processing modules and said second set of processing modules are different sets of processing modules.

26. The router of claim 23, wherein said first and second sets of processing modules comprise means for implementing one or more routing protocols to advertise said internal link to each other.

27. The router of claim 26, wherein said first and second sets of processing modules comprises means for implementing one or more routing protocols to advertise said internal link to the other routers external to said router.

28. The router of claim 23, wherein said first set of processing modules comprises means for maintaining a first internal interface associated with said first logical router, wherein said first internal interface is a logical, non-physical entity.

29. The router of claim 28, wherein said second set of processing modules comprises means for maintaining a second internal interface associated with said second logical router, wherein said second internal interface is a logical, non-physical entity.

30. The router of claim 29, wherein said first set of processing modules comprises means for maintaining said internal link between said first internal interface and said second internal interface.

31. The router of claim 30, wherein said second set of processing modules comprises means for maintaining said internal link between said second internal interface and said first internal interface.

32. The router of claim 23, wherein said first set of processing modules comprises means for constructing a first forwarding table for said first logical router, and wherein said second set of processing modules comprises means for constructing a second forwarding table for said second logical router.

33. The router of claim 32, wherein said first set of processing modules comprises means for providing said first forwarding table to said second set of processing modules, and wherein said second set of processing modules comprises means for providing said second forwarding table to said first set of processing modules.

34. The router of claim 33, wherein said first set of components comprises a first external interface associated with said first logical router, wherein said second set of components comprises a second external interface associated with said second logical router, wherein said first set of processing modules comprises means for providing information in said first forwarding table to both said first and second external interfaces, and wherein said second set of processing modules comprises means for providing information in said second forwarding table to both said first and second external interfaces.

35. The router of claim 34, wherein said first external interface comprises means for forwarding a set of information from said first logical router to said second logical router, said forwarding means traversing both said first forwarding table and said second forwarding table to forward the set of information from said first external interface to said second external interface without passing through said internal link.

36. The router of claim 34, wherein said second external interface comprises means for forwarding a set of information from said second logical router to said first logical router, said forwarding means traversing both said second forwarding table and said first forwarding table to forward the set of information from said second external interface to said first external interface without passing through said internal link.

37. The router of claim 33, wherein said first set of components comprises a first external interface associated with said first logical router, wherein said second set of components comprises a second external interface associated with said second logical router, and wherein said first set of processing modules comprises means for deriving a first pre-traversed table based at least partially upon said first and second forwarding tables, and means for providing information in said first pre-traversed table to said first external interface.

38. The router of claim 37, wherein said first external interface comprises a first forwarding means for forwarding a first set of information from said first logical router to said second logical router, said first forwarding means traversing said first pre-traversed table to forward the first set of information from said first external interface to said second external interface without passing through said internal link.

39. The router of claim 38, wherein said second set of processing modules comprises means for deriving a second pre-traversed table based at least partially upon said first and second forwarding tables, and means for providing information in said second pre-traversed table to said second external interface.

40. The router of claim 39, wherein said second external interface comprises a second forwarding means for forwarding a second set of information from said second logical router to said first logical router, said second forwarding means traversing said second pre-traversed table to forward the second set of information from said second external interface to said first external interface without passing through said internal link.

41. The router of claim 40, wherein said first and second pre-traversed tables are different tables.

42. The router of claim 39, wherein said first set of processing modules does not provide said first pre-traversed table to said second external interface, and wherein said second set of processing modules does not provide said second pre-traversed table to said first external interface.

43. A method for implementing a plurality of logical routers within a physical router, comprising:
establishing a first logical router within a physical router;
establishing a first internal interface associated with said first logical router;
establishing a second logical router within the physical router;
establishing a second internal interface associated with said second logical router;
establishing an internal link between said first and second internal interfaces to link said first and second logical routers, wherein said internal link is a logical, non-physical entity;
advertising said internal link to other routers external to the physical router such that said first and second logical routers appear to the other routers as interconnected standalone routers; and
wherein establishing the first internal interface comprises, assigning an identifier to said first internal interface which indicates that said first internal interface is an internal rather than an external interface.

44. The method of claim 43, wherein said first and second internal interfaces are logical, non-physical entities.

45. The method of claim 43, wherein establishing the second internal interface comprises:
assigning an identifier to said second internal interface which indicates that said second internal interface is an internal rather than an external interface.

46. The method of claim 43, wherein the physical router comprises a first set of one or more processing modules and a first external interface, and wherein establishing the first logical router comprises:
assigning the first set of processing modules to implement functionality for said first logical router; and
associating the first external interface with the first set of processing modules to enable the first external interface to function as an external interface for said first logical router.

47. The method of claim 46, wherein establishing the first logical router further comprises:
establishing a first external link between said first external interface and a first external component.

48. The method of claim 47, wherein the physical router further comprises a second set of one or more processing modules and a second external interface, and wherein establishing the second logical router comprises:
assigning the second set of processing modules to implement functionality for said second logical router; and
associating the second external interface with the second set of processing modules to enable the second external interface to function as an external interface for said second logical router.

49. The method of claim 48, wherein establishing the second logical router further comprises:
establishing a second external link between said second external interface and a second external component.

50. The method of claim 48, wherein the first and second sets of processing modules are different sets of processing modules.

51. The method of claim 48, where the first and second sets of processing modules are the same set of processing modules.

52. An apparatus, comprising:
means for establishing a first logical router within a physical router;
means for establishing a first internal interface associated with said first logical router;
means for establishing a second logical router within the physical router;
means for establishing a second internal interface associated with said second logical router;
means for establishing an internal link between said first and second internal interfaces to link said first and second logical routers, wherein said internal link is a logical, non-physical entity; and
means for advertising said internal link to other routers external to the physical router such that said first and second logical routers appear to the other routers as interconnected standalone routers;

wherein the means for establishing the first internal interface comprises, means for assigning an identifier to said first internal interface which indicates that said first internal interface is an internal rather than an external interface.

53. The apparatus of claim 52, wherein said first and second internal interfaces are logical, non-physical entities.

54. The apparatus of claim 52, wherein the means for establishing the second internal interface comprises:
means for assigning an identifier to said second internal interface which indicates that said second internal interface is an internal rather than an external interface.

55. The apparatus of claim 52, wherein the physical router comprises a first set of one or more processing modules and a first external interface, and wherein the means for establishing the first logical router comprises:
means for assigning the first set of processing modules to implement functionality for said first logical router; and
means for associating the first external interface with the first set of processing modules to enable the first external interface to function as an external interface for said first logical router.

56. The apparatus of claim 55, wherein the means for establishing the first logical router further comprises:
means for establishing a first external link between said first external interface and a first external component.

57. The apparatus of claim 56, wherein the physical router further comprises a second set of one or more processing modules and a second external interface, and wherein the means for establishing the second logical router comprises:
means for assigning the second set of processing modules to implement functionality for said second logical router; and
means for associating the second external interface with the second set of processing modules to enable the second external interface to function as an external interface for said second logical router.

58. The apparatus of claim 57, wherein the means for establishing the second logical router further comprises:
means for establishing a second external link between said second external interface and a second external component.

59. The apparatus of claim 57, wherein the first and second sets of processing modules are different sets of processing modules.

60. The apparatus of claim 57, where the first and second sets of processing modules are the same set of processing modules.

61. A method for forwarding a set of information, comprising:
receiving a set of information;
determining a next hop for said set of information by accessing a first forwarding table associated with a first logical router implemented within the physical router, accessing an entry in said first forwarding table, and obtaining from said entry of said first forwarding table an egress interface identifier;
determining whether said next hop is an internal interface linked to a logical router implemented within a physical router or an external interface coupled to a component that is external to the physical router by processing said egress interface identifier to determine whether said egress interface identifier is an identifier for an internal interface or an identifier for an external interface; and
in response to a determination that said next hop is an internal interface, foregoing forwarding of said set of information to said internal interface.

62. The method of claim 61, further comprising:
repeating the operations of determining a next hop, determining whether said next hop is an internal interface or an external interface, and foregoing forwarding of said set of information, until it is determined that said next hop is an external interface; and
forwarding said set of information to said external interface.

63. The method of claim 61, further comprising:
in response to a determination that said next hop is an internal interface, determining a following next hop for said set of information;
determining whether said following next hop is another internal interface linked to another logical router implemented within the physical router or an external interface coupled to a component that is external to the physical router; and
in response to a determination that said following next hop is internal interface, foregoing forwarding of said set of information to said other internal interface.

64. The method of claim 63, further comprising:
in response to a determination that said following next hop is an external interface, forwarding said set of information to said external interface.

65. The method of claim 61, wherein determining a following next hop for said set of information comprises:
accessing a second forwarding table associated with a second logical router implemented within the physical router;
accessing an entry in said second forwarding table; and
obtaining from said entry of said second forwarding table a second egress interface identifier.

66. The method of claim 65, wherein determining whether said following next hop is another internal interface or an external interface comprises:
processing said second egress interface identifier to determine whether said second egress interface identifier is an identifier for an internal interface or an identifier for an external interface.

67. An apparatus, comprising:
means for receiving a set of information;
means for determining a next hop for said set of information employing means for accessing a first forwarding table associated with a first logical router implemented within the physical router,
means for accessing an entry in said first forwarding table, and
means for obtaining from said entry of said first forwarding table an egress interface identifier;
means for determining whether said next hop is an internal interface linked to a logical router implemented within a physical router or an external interface coupled to a component that is external to the physical router employing means for processing said egress interface identifier to determine whether said egress interface identifier is an identifier for an internal interface or an identifier for an external interface; and
means for foregoing, in response to a determination that said next hop is an internal interface, forwarding of said set of information to said internal interface.

68. The apparatus of claim 67, further comprising:
means for repeating the operations of determining a next hop, determining whether said next hop is an internal interface or an external interface, and foregoing forwarding of said set of information, until it is determined that said next hop is an external interface; and means for forwarding said set of information to said external interface.

69. The apparatus of claim 67, further comprising:
means for determining, in response to a determination that said next hop is an internal interface, a following next hop for said set of information;
means for determining whether said following next hop is another internal interface linked to another logical router implemented within the physical router or an external interface coupled to a component that is external to the physical router; and
means for foregoing, in response to a determination that said following next hop is another internal interface, forwarding of said set of information to said other internal interface.

70. The apparatus of claim 69, further comprising:
means for forwarding, in response to a determination that said following next hop is an external interface, said set of information to said external interface.

71. The apparatus of claim 67, wherein the means for determining a following next hop for said set of information comprises:
means for accessing a second forwarding table associated with a second logical router implemented within the physical router;
means for accessing an entry in said second forwarding table; and
means for obtaining from said entry of said second forwarding table a second egress interface identifier.

72. The apparatus of claim 71, wherein the means for determining whether said following next hop is another internal interface or an external interface comprises:
means for processing said second egress interface identifier to determine whether said second egress interface identifier is an identifier for an internal interface or an identifier for an external interface.

73. The apparatus of claim 72, wherein said apparatus comprises said first and second forwarding tables.

74. The apparatus of claim 67, wherein said apparatus comprises a line card of the physical router.

75. A method for deriving a pre-traversed table from a plurality of forwarding tables instantiated in a database, comprising:
accessing a base forwarding table;
accessing an entry in said base forwarding table;
obtaining from said entry of said base forwarding table an address and an egress interface identifier;
determining whether said egress interface identifier is an internal interface identifier or an external interface identifier, wherein an internal interface identifier identifies an internal interface that is linked to a logical router implemented within a physical router, and an external interface identifier identifies an external interface that is coupled to a component that is external to the physical router;
in response to a determination that said egress interface identifier is an internal interface identifier, accessing another forwarding table instantiated in a database;
accessing an entry in said other forwarding table;
obtaining from said entry of said other forwarding table another egress interface identifier;
determining whether said other egress interface identifier is an internal interface identifier or an external interface identifier; and
in response to a determination that said other egress interface identifier is an external interface identifier, storing said address and said external interface identifier into an entry in a pre-traversed table instantiated in a database.

76. The method of claim 75, further comprising:
storing into said entry of said pre-traversed table an indication of how many forwarding tables were accessed to obtain said external interface identifier.

77. The method of claim 75, wherein said pre-traversed table corresponds to a base logical router implemented within the physical router.

78. The method of claim 75, wherein said base forwarding table is associated with a base logical router implemented within the physical router, wherein said base logical router has a set of one or more external interfaces associated therewith, and wherein said method further comprises:
providing information in said pre-traversed table to said set of external interfaces.

79. The method of claim 78, wherein information in said pre-traversed table is not provided to any external interfaces not associated with said base logical router.

80. The method of claim 75, further comprising:
in response to a determination that said other egress interface identifier is an internal interface identifier, repeating the operations of accessing another forwarding table, accessing an entry in said other forwarding table, obtaining from said entry of said other forwarding table another egress interface identifier, and determining whether said other egress interface identifier is an internal interface identifier or an external interface identifier, until it is determined that said other egress interface identifier is an external interface identifier; and
storing said address and said external interface identifier into an entry in said pre-traversed table.

81. The method of claim 80, further comprising:
storing into said entry of said pre-traversed table an indication of how many forwarding tables were accessed to obtain said external interface identifier.

82. The method of claim 80, wherein said pre-traversed table corresponds to a base logical router implemented within the physical router.

83. The method of claim 82, wherein said base forwarding table is associated with a base logical router implemented within the physical router, wherein said base logical router has a set of one or more external interfaces associated therewith, and wherein said method further comprises:
providing information in said pre-traversed table to said set of external interfaces.

84. The method of claim 83, wherein information in said pre-traversed table is not provided to any external interfaces not associated with said base logical router.

85. An apparatus for deriving a pre-traversed table from a plurality of forwarding tables, comprising:
means for accessing a base forwarding table;
means for accessing an entry in said base forwarding table;
means for obtaining from said entry of said base forwarding table an address and an egress interface identifier;
means for determining whether said egress interface identifier is an internal interface identifier or an external interface identifier, wherein an internal interface identifier identifies an internal interface that is linked to a logical router implemented within a physical router, and an external interface identifier identifies an external interface that is coupled to a component that is external to the physical router;
means for accessing, in response to a determination that said egress interface identifier is an internal interface identifier, another forwarding table;

means for accessing an entry in said other forwarding table;
means for obtaining from said entry of said other forwarding table another egress interface identifier;
means for determining whether said other egress interface identifier is an internal interface identifier or an external interface identifier; and
means for storing, in response to a determination that said other egress interface identifier is an external interface identifier, said address and said external interface identifier into an entry in a pre-traversed table.

86. The apparatus of claim 85, further comprising:
means for storing into said entry of said pre-traversed table an indication of how many forwarding tables were accessed to obtain said external interface identifier.

87. The apparatus of claim 85, wherein said pre-traversed table corresponds to a base logical router implemented within the physical router.

88. The apparatus of claim 85, wherein said base forwarding table is associated with a base logical router implemented within the physical router, wherein said base logical router has a set of one or more external interfaces associated therewith, and wherein said apparatus further comprises:
means for providing information in said pre-traversed table to said set of external interfaces.

89. The apparatus of claim 88, wherein information in said pre-traversed table is not provided to any external interfaces not associated with said base logical router.

90. The apparatus of claim 85, further comprising:
means for repeating, in response to a determination that said other egress interface identifier is an internal interface identifier, the operations of accessing another forwarding table, accessing an entry in said other forwarding table, obtaining from said entry of said other forwarding table another egress interface identifier, and determining whether said other egress interface identifier is an internal interface identifier or an external interface identifier, until it is determined that said other egress interface identifier is an external interface identifier; and
means for storing said address and said external interface identifier into an entry in said pre-traversed table.

91. The apparatus of claim 90, further comprising:
means for storing into said entry of said pre-traversed table an indication of how many forwarding tables were accessed to obtain said external interface identifier.

92. The apparatus of claim 90, wherein said pre-traversed table corresponds to a base logical router implemented within the physical router.

93. The apparatus of claim 92, wherein said base forwarding table is associated with a base logical router implemented within the physical router, wherein said base logical router has a set of one or more external interfaces associated therewith, and wherein said apparatus further comprises:
means for providing information in said pre-traversed table to said set of external interfaces.

94. The apparatus of claim 93, wherein information in said pre-traversed table is not provided to any external interfaces not associated with said base logical router.

95. The apparatus of claim 85, wherein said apparatus comprises said base forwarding table and at least one other forwarding table.

96. The apparatus of claim 85, wherein said apparatus comprises a processing module of a router.

97. A router, comprising:
a first set of one or more components capable of being configured to implement a first logical router having a first external interface within said router;
a second set of one or more components capable of being configured to implement a second logical router having a second external interface within said router; and
computer hardware for forwarding a set of information from said first logical router to said second logical router directly from said first external interface to said second interface without passing through an internal link;
wherein said first and second sets of components comprise functionality for establishing said internal link between said first logical router and said second logical router and advertising said internal link to other routers external to said router such that said first and second logical routers appear to the other routers as interconnected standalone routers, wherein said internal link is a logical, non-physical entity.

* * * * *

UNITED STATES PATENT AND TRADEMARK OFFICE
CERTIFICATE OF CORRECTION

PATENT NO.        : 7,630,358 B1                                            Page 1 of 1
APPLICATION NO.   : 10/192766
DATED             : December 8, 2009
INVENTOR(S)       : Lakhani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1804 days.

Signed and Sealed this

Second Day of November, 2010

David J. Kappos
*Director of the United States Patent and Trademark Office*